United States Patent
Perry et al.

(10) Patent No.: US 6,195,501 B1
(45) Date of Patent: *Feb. 27, 2001

(54) COMPUTER CONTROL OF A VIDEO CASSETTE RECORDER USING WIRELESS COMMUNICATION AND A VERTICAL BLANKING INTERVAL TRIGGERING

(75) Inventors: Burt Perry, Beaverton; Steve Batchelor, Hillsboro, both of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/623,585

(22) Filed: Mar. 28, 1996

(51) Int. Cl.[7] ............................................ H04N 5/76
(52) U.S. Cl. ............................................ 386/83; 348/906
(58) Field of Search ........................ 386/83, 46; 348/731, 348/732, 13, 734, 906; 360/69; 455/179.1, 185.1, 186.1, 186.2; H04N 5/76, 5/78, 5/781, 5/782, 5/783, 5/92, 5/50, 5/44

(56) References Cited

U.S. PATENT DOCUMENTS

| | | | |
|---|---|---|---|
| 4,706,121 | * 11/1987 | Young | 386/83 |
| 4,963,994 | * 10/1990 | Levine | 386/83 |
| 4,977,455 | * 12/1990 | Young | 386/83 |
| 5,056,070 | * 10/1991 | Shibuya et al. | 386/83 |
| 5,113,294 | * 5/1992 | Kim | 386/83 |
| 5,293,357 | * 3/1994 | Hallenbeck | 386/83 |
| 5,307,173 | * 4/1994 | Yuen et al. | 386/83 |
| 5,481,296 | * 1/1996 | Cragun et al. | 348/13 |
| 5,488,409 | * 1/1996 | Yuen et al. | 386/83 |
| 5,515,173 | * 5/1996 | Mankovitz et al. | 455/186.1 |
| 5,526,130 | * 6/1996 | Kim | 386/83 |
| 5,557,422 | * 9/1996 | Nishigaki et al. | 386/83 |
| 5,557,724 | * 9/1996 | Sampat et al. | 395/157 |
| 5,646,603 | * 7/1997 | Nagata et al. | 348/474 |

FOREIGN PATENT DOCUMENTS

0607734A2   7/1994   (EP) .

\* cited by examiner

*Primary Examiner*—Thai Tran
(74) *Attorney, Agent, or Firm*—Blakely, Sokoloff, Taylor & Zafman LLP (57) ABSTRACT

A system that allows a personal computer to remotely control the operation of a video cassette recorder (VCR). The system includes a radio frequency (RF) transmitter connected to a personal computer. The personal computer is programmed to generate a first VCR control signal that is transmitted by the RF transmitter to a RF receiver located within a transceiver base unit. The transceiver base unit transmits a second VCR control signal, using an infrared transmitter, to the VCR in response to the first VCR control signal. The VCR control signals include commands to record, stop, play, etc. the video cassette recorder. The first VCR control signal can be transmitted in response to a control data signal that is inserted into the vertical blanking interval of a publicly broadcasted video signal that is received and decoded by the computer. The control data signal may contain program information which is used to trigger the transmission of the first VCR control signal.

19 Claims, 5 Drawing Sheets

COMPUTER CONTROL OF A VIDEO CASSETTE RECORDER USING WIRELESS COMMUNICATION AND A VERTICAL BLANKING INTERVAL TRIGGERING

BACKGROUND OF THE INVENTION

1. Field of the Invention

The present invention relates to a system for controlling a video cassette recorder from a personal computer.

2. Description of Related Art

Personal computers have been developed and marketed with the capability to receive and display publicly broadcasted television signals. The broadcasted video images may be displayed in a separate window that allows the user to watch television while performing other operations on the personal computer. It may be desirable to store the television signals in a disk drive of the computer. Analog video signals, once digitized, typically require a large amount of memory space on the disk. For this reason, storing television signals on the disk drive is generally undesirable.

It would be desirable to store the video signals on a mass storage device such as a video cassette recorder (VCR). It would also be desirable to control the operation of the VCR from a personal computer. Video cassette recorders are typically located in a different room than the personal computer. Therefore a system that controls a video cassette recorder through a personal computer would require routing a plurality of cables between the VCR and the computer. Routing cables can be both expensive and time consuming. It would be desirable to provide a system that allows a personal computer to remotely control the operation of a video cassette recorder.

SUMMARY OF THE INVENTION

The present invention is a system that allows a personal computer to remotely control the operation of a video cassette recorder (VCR). The system includes a radio frequency (RF) transmitter connected to a personal computer. The computer is programmed to generate a first VCR control signal that is transmitted by the RF transmitter to a RF receiver located within a transceiver base unit. The transceiver base unit transmits a second VCR control signal to the VCR using an infrared (IR transmitter) in response to the first VCR control signal. The VCR control signals include commands to record, stop, play, etc. the video cassette recorder. The first VCR control signal can be transmitted in response to a control data signal that is inserted into the vertical blanking interval of a publicly broadcasted video signal that is received and decoded by the personal computer. The control data signal may contain program information which is used to trigger the transmission of the first VCR control signal.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
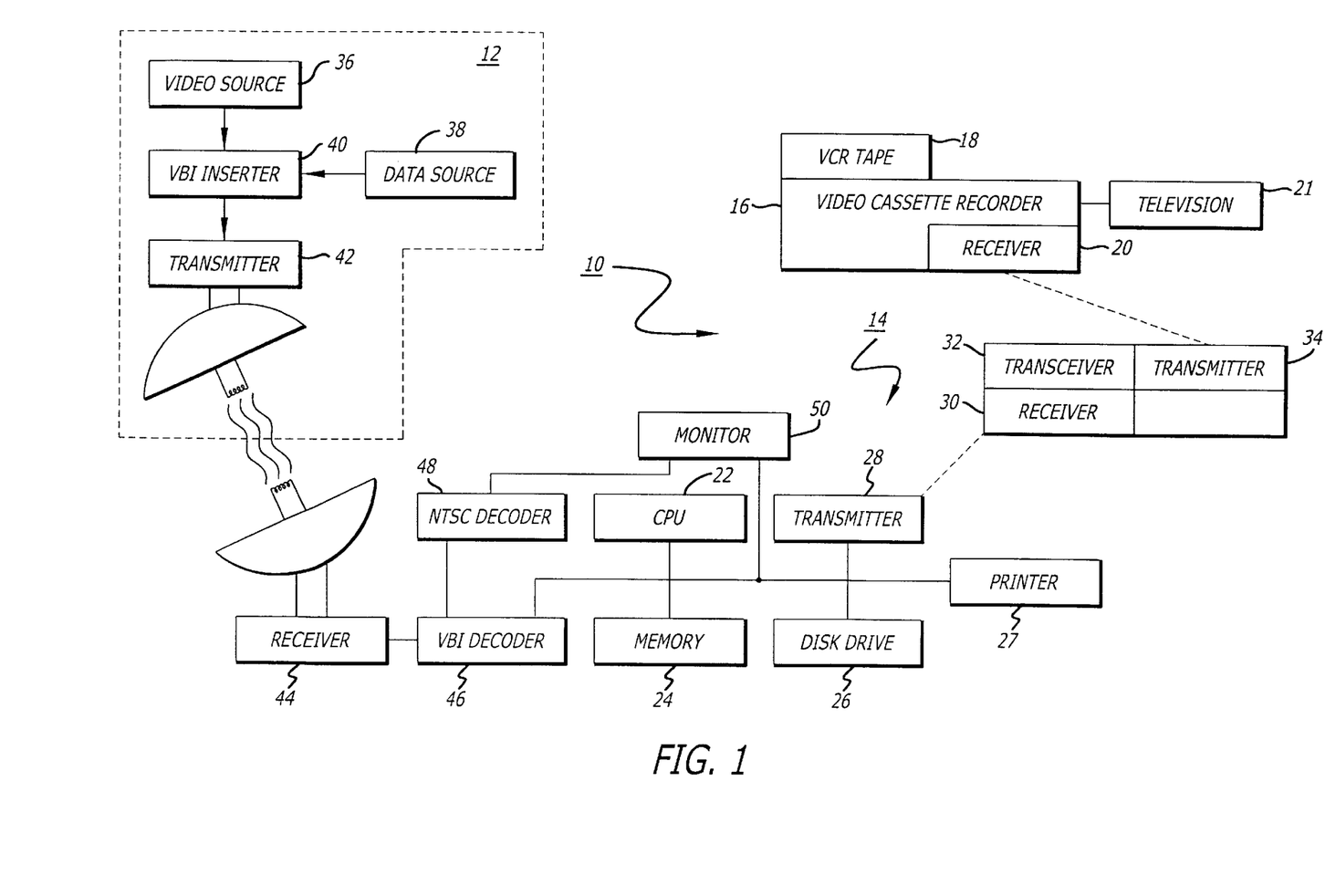
FIG. 1 is a schematic of a video cassette recording system of the present invention.

Referring to the drawings more particularly by reference numbers, FIG. 1 shows a video cassette recording system 10 of the present invention. The system includes a broadcaster 12, a personal computer 14 and a video cassette recorder (VCR) 16. The video cassette recorder 16 receives a video cassette tape 18. The VCR 16 can read and write video signals onto the tape 18. The VCR 16 has internal circuitry to perform start, stop, play, rewind, forward, etc. functions as is known in the art. The VCR 16 has a remote receiver 20 which can receive VCR control signals that control the various start, record, play, stop, etc. functions of the recorder 16. The remote receiver 20 may receive input signals in the infrared (IR) waveband. Alternatively, the remote receiver 20 may receive input signals in the radio frequency (RF) waveband. The video cassette recorder 16 is typically connected to a television receiver 21 which may also have a remote receiver (not shown).

The personal computer 14 includes a central processing unit (CPU) 22, a memory device 24 and a mass storage device such as a disk drive 26. The personal computer 14 may be connected to a printer 27. The computer 14 generates the first VCR control signal that is transmitted by a transmitter 28. The transmitter 28 may be a RF device. The first VCR control signal may be received by the receiver 30 of a transceiver base unit 32. Alternatively, the first VCR control signal may be received by the remote receiver 20 of the VCR. The transceiver 32 may have a transmitter 34 that transmits a second VCR control signal in response to the reception of the first VCR control signal. The second VCR control signal may be received by the remote receiver 20 of the VCR. In the preferred embodiment, the transmitter 28 and transceiver receiver 30 are RF devices. The transceiver transmitter 34 and VCR receiver 20 are preferably IR devices. The transceiver 32 can also generate control signals to control the television receiver 21, including signals to change the channels of the television 21.

The broadcaster 12 may include a video signal source 36 that generates a video signal and a data signal source 38 that generates a data signal. The broadcaster 12 may also include a vertical blanking interval (VBI) inserter 40 that inserts the data signal into the vertical blanking interval of the video signal. The inserted video signal is transmitted by a transmitter 42. The VBI inserter 40 may be a unit sold by Norpak Corp. of Ottawa, Ontario, Canada under the model number TDS-3 or similar ones from Wavephone of Canada or EEG of New York. The data source 38 may generate data that corresponds to the program being broadcasted from the video source 36. By way of example, the data signal may include a title and a description of the broadcasted program.

There has been developed a standard commonly referred to as XDS which defines the information which can be inserted into a vertical blanking interval of a video signal.

The personal computer 14 is connected to a television receiver 44 which can receive the inserted video signal transmitted by the broadcaster 12. The receiver 44 contains a tuner that can tune to various broadcasted channels. The receiver 44 is connected to a vertical blanking interval decoder 46 which separates the data signal from the video signal. The video signal may be connected to a NTSC decoder 48 which decoded the decoded video signal to a computer monitor 50. The separated data signal is provided to the CPU 22 for further processing.

Figures 2, 3, 4, 5:
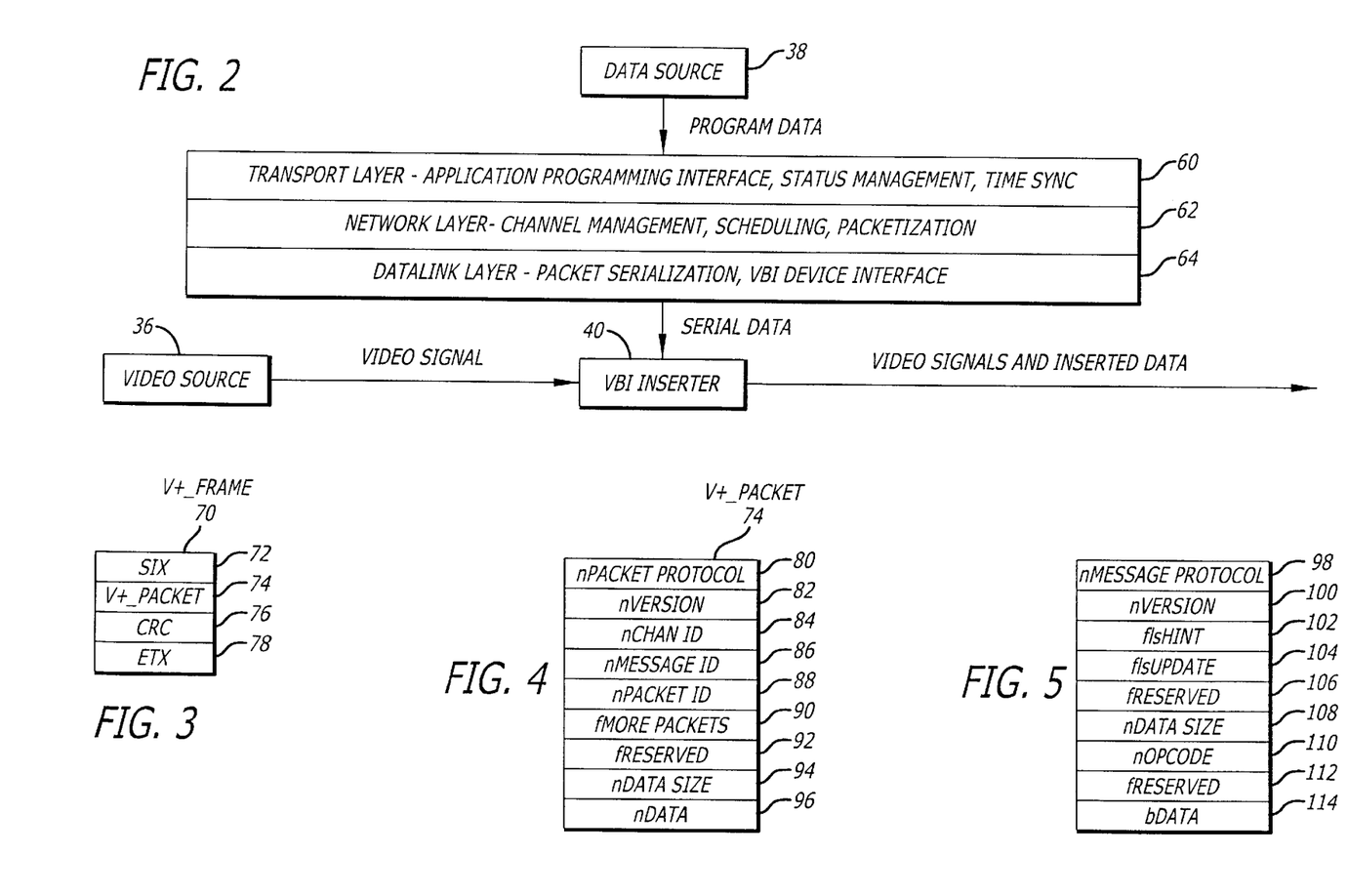
FIG. 2 is a schematic showing the layers of a video encoder.
FIG. 3 is a schematic showing the formatting of a video frame that is inserted into the video blanking interval of a video signal.
FIG. 4 is a schematic showing the formatting of a video packet.
FIG. 5 is a schematic showing the formatting of a message provided to the encoder.

As shown in FIG. 2, the format of the inserter 40 may have different application layers, including a transport layer 60, a network layer 62 and a datalink layer 64 which convert the program information into a serial data stream that can be inserted into the vertical blanking interval by the VBI inserter 40. The transport layer 60 provides an interface with the data source 38. The network layer 62 packetizes the data. The datalink layer 64 serializes the packeted data for serial transmission to the VBI inserter 40.

In the preferred embodiment, the data is provided to the VBI inserter in a Vt_Frame 70 shown in FIG. 3. The Vt_Frame 70 includes a start frame field STX 72, a data packet field Vt_Packet 74, a check field CRC 76 and an end of frame character ETX 78.

In the preferred embodiment, the Vt_Packet 74 is formatted as shown in FIG. 4. The nPacketProtocal field 80 is a byte-length field which identifies the packet as one supported by the protocol. The nVersion field 82 specifies the type of inserter that is transmitting the packet. The nChanID field 84 is an integer value which provides the channel number of the packet in the serialized bitstream. The nMessageID field 86 specifies the message number of the channel on which the packet is transmitted. The nPacketID field 88 defines the number of packets in a particular message. The fMorePackets field 90 specifies whether there are any more packets in the message. The fReserved field 92 is reserved for further use. The length of the data is specified in the nDataSize field 94. The nData field 96 contains the data.

In the preferred embodiment, the data is typically provided to the inserter 40 by the data source in the format shown in FIG. 5. The nMessageProtocal field 98 is a byte length field which identifies the type of transmission being provided. The nVersion field 100 identifies the version of the protocol. The flsHint field 102 indicates that the data is to precede an event such as a television program. The flsUPdate field 104 indicates whether the information is updating transmitted information. The fReserved field 106 is unused and reserved for later use. The field nDataSize 108 specifies the number of bytes in the data field. The nOpcode field 110 define a particular operation to be performed with the data. For example, the operation may be a read memory command. The fReserved2 field 112 is not used and the bData field 114 contains the data.

Figure 6:
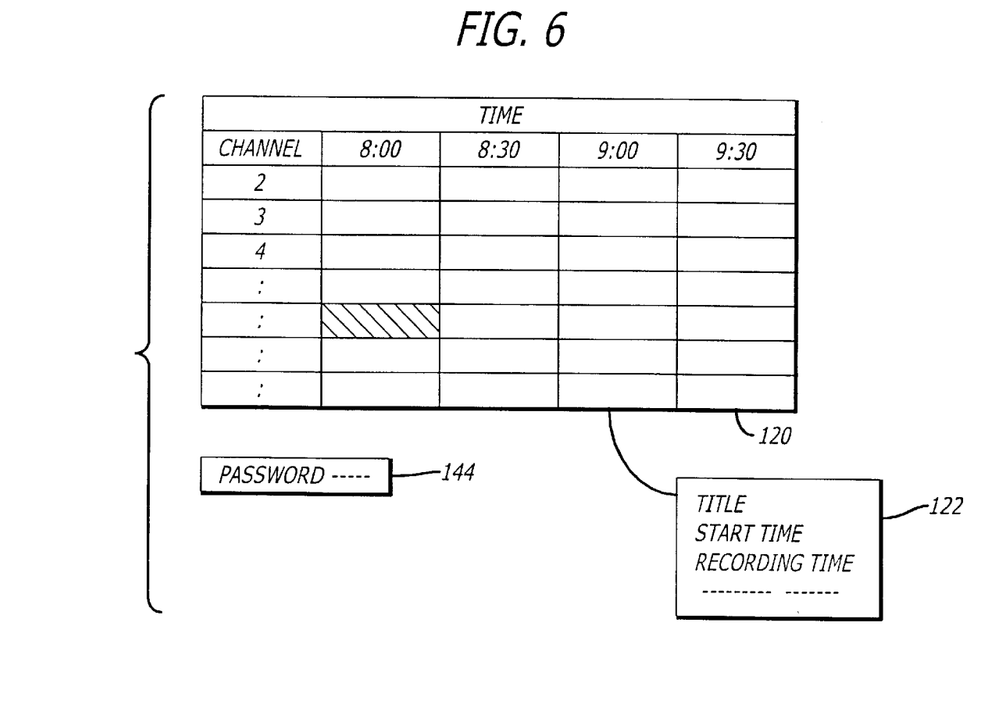
FIG. 6 is a graphical user interface of a program map.

As shown in FIG. 6, the personal computer 14 may contain a program that creates a graphical user interface program map 120 which is displayed by the computer monitor 50. The map 120 may be divided into a plurality of blocks that correspond to TIME and CHANNEL listings. The data signals inserted into the vertical blanking interval of the video signal may have program information that is displayed by the map 120. For example, the broadcaster 12 may periodically insert data that provides the title and a short description of the present broadcasted program plus three subsequent programs, and so forth and so on. The personal computer 14 receives the program information and displays the title and description within the appropriate block. The personal computer can continuously update the static map 120 with broadcasted program information.

The user can record a program(s) by selecting the appropriate box(es) on the map 120. By way of example, the user can request a recording of a program on channel 2 that begins at 9:00 PM by selecting the box that corresponds to channel 2 and 9:00 PM. The program then stores the selection in memory.

At a predetermine time interval before 9:00 PM the personal computer generates VCR control signals to initiate a recording sequence of the program with the video cassette recorder. The first VCR control signals can be generated when new program information is detected in the vertical blanking interval, indicating that a new program has begun. The selected programs can be highlighted to indicate which programs will be recorded. Each highlighted program may have a "drop box" 122 which list the title, start, recording time, etc. of the selected program. The drop box 122 may be reviewed by entering a command or double selecting the map block.

Figure 7:
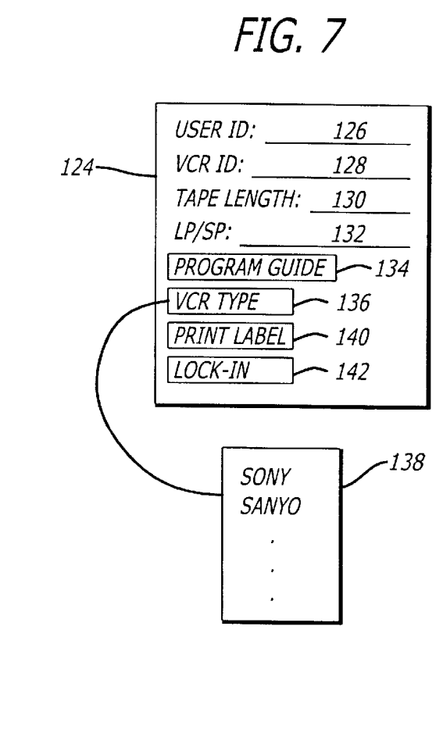
FIG. 7 is a graphical user interface showing a plurality of configuration fields.

As shown in FIG. 7, the program may have a configuration dialog 124 which contains a user identification (ID) field 126, a video cassette tape ID field 128, a tape length field 130, a recording speed field 132 and a Program Guide command 134. The static map 120 can be viewed by selecting the Program Guide Command 134. The dialog 124 may also have a VCR type command 136 with a separate drop box 138 that list the various manufacturing brands of video cassette recorders. The personal computer may have a look up table that contains the various control signal protocols for the different VCRs. The correct control signals can be generated when the user selects the make of the VCR in the drop box 138. The dialog may contain a Print Label field 140 which when selected prints a label of the programs that are recorded. The dialog may also include a Parental Lock-in field 142 which when selected prevents recording or viewing of a program unless a valid password is entered. The static map 120 may include a password field 144 that receives a password.

Figure 8:
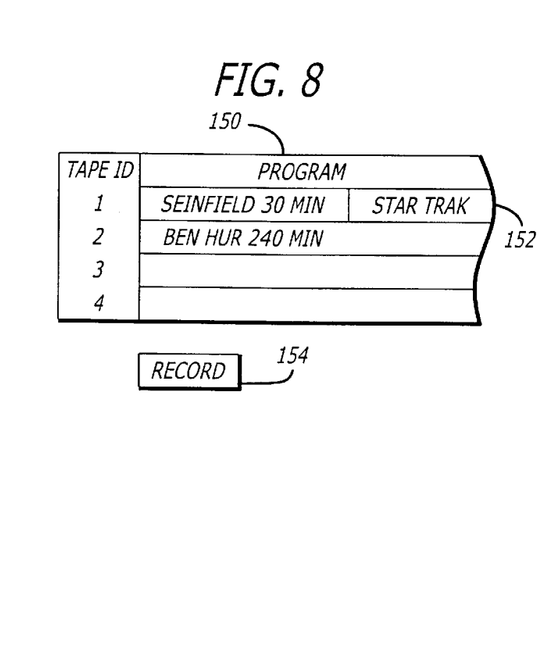
FIG. 8 is a graphical user interface showing a tape replay dialog.

As shown in FIG. 8, the program may include a dialog 150 that list the various programs that were recorded. The dialog 150 may have a plurality of tape slots 152 that each contain the start time and title of a recorded program. A recorded program can be viewed by the user by selecting a tape slot 152. In response to the selection of a tape slot 152, the computer generates VCR control signals to rewind the video cassette tape and then forward the tape (if required) to the location of the selected program. The dialog 150 may also have a Record command 154 that allows the user to select which part of the tape will be used for further recording. For example, the user may select PROGRAM 2 to be the slot in the tape where the next recorded program is to be stored. The personal computer compares the length of the next recorded program selected by the user with the selected tape slot to insure that the tape slot has enough space to store the entire program. If the next selected program exceeds the time interval of the tape slot, the program may provide a message to request the user to select another tape slot or another tape.

Figure 9A:
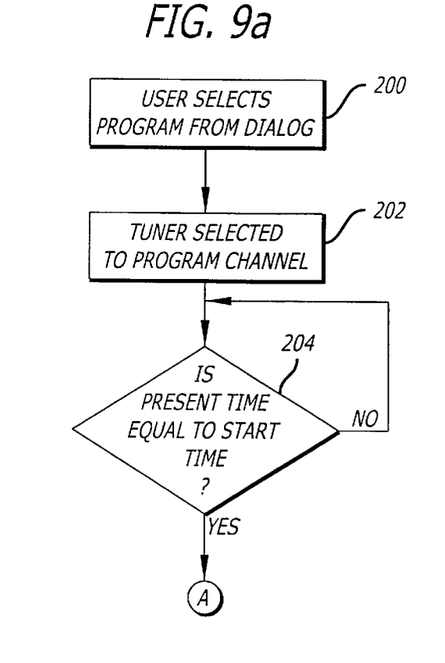
FIGS. 9a–b are flowcharts showing the recording of a program.
Figure 9B:
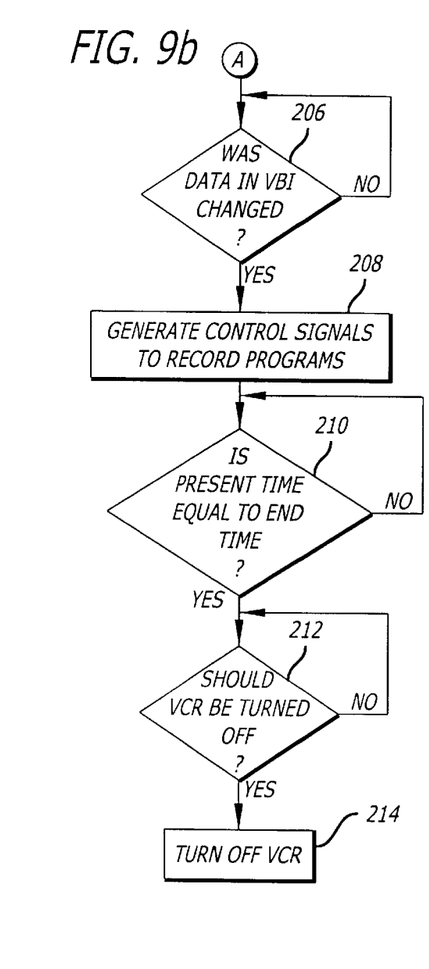

FIGS. 9*a*–*b* show a flowchart of a process that records a program. In processing block 200 the user has selected the appropriate entries in the configuration dialog, including the selection of program that is to be recorded. The personal computer sets the tuner of the receiver 44 to the selected channel in block 202. In decision block 204, the process determines whether the present time equals the start time of the selected program. The start time that is compared with the present time, may be slightly before the program start time to allow for the generation of control signals and the power, tuning, etc. of the VCR.

If the times are equal, the process continues to decision block 206 to determine whether the vertical blanking data has changed. A change in the vertical blanking data is an indication that a new program has started. If the vertical blanking data has changed, the personal computer generates VCR control signals to turn on the VCR, select the appropriate channel and record the program in block 208. The process proceeds to decision block 210 which compares the present time with the end time of the selected program. When the times are equal the personal computer generates control signals to stop the VCR and store the program information in the dialog 150 in block 212. The program then determines whether the VCR should be turned off, factoring whether another program has been selected for recording and the time interval until the broadcasting of the selected program in decision block 214. If the VCR is to be turned off, the personal computer generates control signals to turn off the VCR. The process then proceeds back to block 200.

Figure 10A:
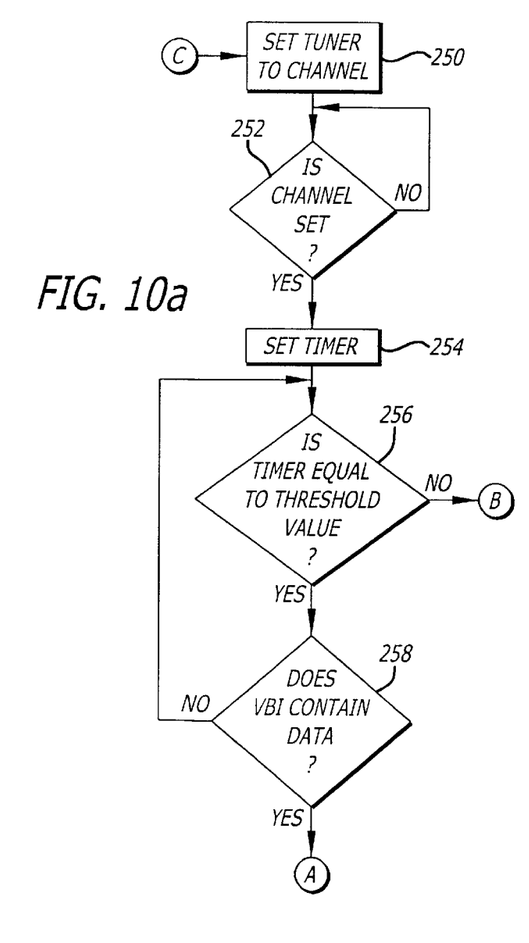
FIGS. 10a–b are flowcharts showing the scanning of television channels for program information.
Figure 10B:
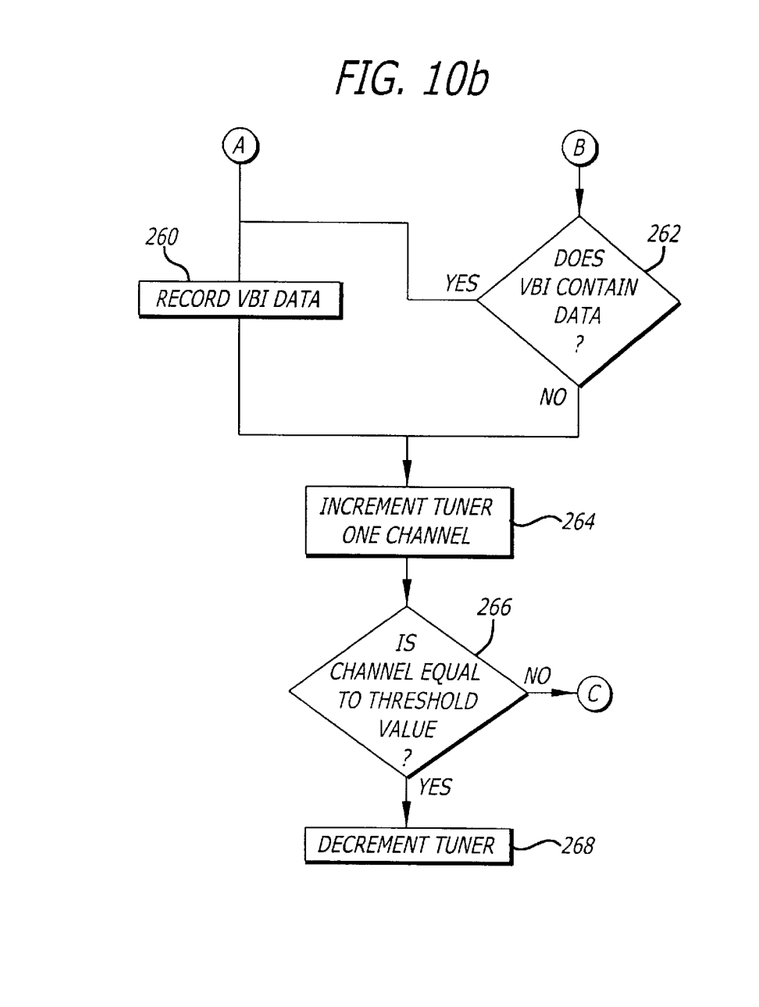

FIGS. 10a–b show a flowchart of a personal computer process that scans the broadcasted channels to retrieve program information from the vertical blanking interval. The tuner of the personal computer is set to a first channel in processing block 250. The personal computer determines whether the channel is set in decision block 252. If the channel is set a timer is started in block 254. The value of the timer is compared to a threshold time value in decision block 256. if the value of the timer is less than the threshold value then the process proceeds to decision block 258 to determine if there is data in the vertical blanking interval. If there is vertical blanking data, the data is stored in the personal computer in block 260. If there is no data the process proceeds back to block 256.

If the timer value is equal to the threshold value the process proceeds to decision block 262 to determine whether there is vertical blanking interval data. If there is vertical blanking data the data is stored in block 260. After the vertical blanking data is stored, or if there is no data as determined in block 262, the tuner is incremented one channel in block 264. The process proceeds to decision block 266 which determines whether the channel is equal to a threshold value. If the incremented channel is equal to the threshold value the channel is decremented back to the original channel in block 268. After block 264 and 266 the process proceeds to block 250. The information stored in block 260 is used to fill the static map 120 of the program and may also be used to trigger a recording of a program.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system for remotely programming a video cassette recorder that has a remote receiver, the video cassette recorder being coupled to a television receiver, comprising:

a computer located external to the video cassette recorder, the computer includes a computer monitor to display a graphical user interface, and a first decoder to receive a broadcast signal and separate a control data signal having program information from the broadcast signal, the computer to display the program information on the graphical user interface to allow user selection of the program information, the computer includes a second decoder which decodes the broadcast signal so that a broadcast video image is displayed on the computer monitor, the computer further includes a wireless transmitter to transmit a first VCR control signal in response to the user selection of the program information; and a transceiver located external to the computer and the video cassette recorder, the transceiver to receive the first VCR control signal and, responsive thereto, to wirelessly transmit a second VCR control signal to the remote receiver of the video cassette recorder to control the video cassette recorder.

2. The system as recited in claim 1, wherein said computer transmits said first VCR control signal in response to detecting a new program information in a vertical blanking interval.

3. The system as recited in claim 2, wherein said control data signal includes program information regarding a publicly broadcasted program.

4. The system as recited in claim 3, wherein said computer compares said program information with previous program information, and said computer transmits said first VCR control signal if said program information does not match said previous program information.

5. The system as recited in claim 1, wherein the transmitter comprises a radio frequency transmitter that transmits said first control signal, and wherein the transceiver includes a radio frequency receiver that receives said first VCR control signal.

6. The system as recited in claim 5, wherein said transceiver includes an infrared transmitter that generates said second VCR control signal.

7. The system as recited in claim 1, wherein said first and second VCR control signals include a start command to start recording a video signal with the video cassette recorder, and a stop command which terminates the recording of the video signal.

8. The system as recited in claim 1, where in said first and second VCR control signals include a play command to start playing a recorded video signal with the video cassette recorder, and a stop command which terminates the playing of the video signal.

9. A system for remotely programming a video cassette recorder that has a remote receiver, the video cassette recorder being coupled to a television receiver, comprising:

computer means located external to the video cassette recorder, the computer means for (i) displaying a graphical user interface on a computer monitor, (ii) receiving a broadcast signal and separating a control data signal having program information from the broadcast signal, (iii) displaying the program information on the graphical user interface to allow user selection of the program information, (iv) decoding the broadcast signal so that a broadcast video image is displayed on the computer monitor, and (v) wirelessly transmitting a first VCR control signal in response to the user selection of the program information; and transceiver means located external to the computer means and the video cassette recorder, the transceiver means for receiving the first VCR control signal and, responsive thereto, for wirelessly transmitting a second VCR control signal to the remote receiver of the video cassette recorder to control the video cassette recorder.

10. A system for remotely programming a video cassette recorder that has a remote receiver, the video cassette recorder being coupled to a television receiver, comprising:

computer means located external to the video cassette recorder, said computer means including a computer monitor to display a graphical user interface and a first decoder to receive a broadcast signal and to separate a control data signal having program information from said broadcast signal, said computer means displaying said program information on said graphical user interface to allow user selection of said program information and to display data entered by a user, said computer means generating a first VCR control signal, said computer means further including a wireless transmitter which transmits said first VCR control signal, said first VCR control signal being a function of said entered data, said computer means further includes a second decoder which decodes a broadcasted signal so that a broadcasted video image is displayed by said computer monitor; and transceiver means for receiving said first VCR control signal and transmitting a second VCR control signal to the remote receiver of the video cassette recorder, wherein said first and second VCR control signals provide a control command to control the video cassette recorder.

11. The system as recited in claim 10, wherein said first decoder includes a vertical blanking decoder which removes said control data signal from said broadcast signal received by said computer means, wherein said computer generates said first VCR control signal in response to said control data signal.

12. The system as recited in claim 10, wherein said computer means compares said program information with previous program information, and said computer means transmits said first VCR control signal if said program information does not match said previous program information.

13. The system as recited in claim 10, wherein said computer means includes radio frequency transmitter means for transmitting said first control signal, and wherein said transceiver means includes radio frequency receiver means for receiving said first VCR control signal.

14. The system as recited in claim 13, wherein said transceiver means includes infrared transmitter means for generating said second VCR control signal.

15. The system as recited in claim 10, wherein said first and second VCR control signals include a start command to start recording a video signal with the video cassette recorder, and a stop command which terminates the recording of the video signal.

16. The system as recited in claim 10, wherein said first and second VCR control signals include a play command to start playing a recorded video signal with the video cassette recorder, and a stop command which terminates the playing of the video signal.

17. The system as recited in claim 11, wherein said computer means continually scans a plurality of television channels to receive a plurality of program information.

18. A method for recording a transmitted video signal on a video cassette recorder that is coupled to a television receiver, comprising:

displaying a graphical user interface on a computer monitor;

entering data into a field of the graphical user interface;

inserting a control data signal into a video signal;

transmitting the video and control data signals;

receiving the video and control data signals;

separating the control data signal which has program information from the video signal;

displaying the program information on the graphical user interface on the computer monitor to allow user selection of the program information along with entered data;

decoding the transmitted video signal;

displaying the video signal on the computer monitor;

comparing the separated control data with the entered data;

transmitting wirelessly a first VCR control signal from a computer located external to the VCR to a transceiver located external to the computer and the VCR, in response to the separated control data signal if the control data signal matches the entered data;

receiving said first VCR control signal by said transceiver;

transmitting wirelessly a second VCR control signal from said transceiver to the video cassette recorder, in response to said first VCR control signal, wherein said first and second VCR control signals provide a control command to control the video cassette recorder; and, recording the video signal in response to the first VCR control signal.

19. The method as recited in claim 18, further comprising entering a program start time, comparing the program start time with a present time, and transmitting said first VCR control signal when the program start time equals the present time.

* * * * *

UNITED STATES PATENT AND TRADEMARK OFFICE
CERTIFICATE OF CORRECTION

PATENT NO.    : 6,195,501 B1
DATED         : February 27, 2001
INVENTOR(S)   : Perry et al.

It is certified that error appears in the above-identified patent and that said Letters Patent is hereby corrected as shown below:

<u>Title page,</u>
Item [54] Title, before "COMPUTER" insert -- PERSONAL --.

<u>Column 5,</u>
Line 66, after "a" insert -- personal --.
Line 67, after "the" insert -- personal --.

<u>Column 6,</u>
Lines 6 and 9, after "the" insert -- personal --.
Line 12, after "the" (1st occurrence) insert -- personal --.
Line 14, after "signal" insert -- from the personal computer --.
Line 17 and 24, after "said" insert -- personal --.

<u>Column 7,</u>
Lines 4 and 33, before "computer" insert -- personal --.
Lines 5, 9, 12, 14, 17 and 34, after "said" insert -- personal --.
Line 20, after "for" insert -- wirelessly --.
Line 21, after "signal" insert -- from said personal computer means --; and after "and" insert -- wirelessly --.
Line 29, in both occurrences after "said" insert -- personal --.

<u>Column 8,</u>
Lines 5 and 30, before "computer" insert -- personal --.
Line 9, after "receiver" insert -- utilizing a personal computer --.
Line 31, after "the" insert -- personal --.

Signed and Sealed this

Fourth Day of June, 2002

*Attest:*

*Attesting Officer*

JAMES E. ROGAN
*Director of the United States Patent and Trademark Office*